United States Patent

[11] 3,609,044

| [72] | Inventor | Thomas J. Murphy |
| | | Rochester, N.Y. |
| [21] | Appl. No. | 838,177 |
| [22] | Filed | July 1, 1969 |
| [45] | Patented | Sept. 28, 1971 |
| [73] | Assignee | Eastman Kodak Company |
| | | Rochester, N.Y. |

[54] APPARATUS FOR SELECTIVELY INSPECTING A WEB SURFACE AND A COATING ON THE SURFACE
10 Claims, 3 Drawing Figs.

[52] U.S. Cl. .................................................. 356/120, 356/200
[51] Int. Cl. ........................................... G01b 11/30
[50] Field of Search ........................................... 356/120, 200

[56] References Cited
UNITED STATES PATENTS

| 2,253,054 | 8/1941 | Tuttle et al. ................... | 356/120 |
| 2,379,263 | 6/1945 | Ving ............................ | 356/120 |
| 2,867,149 | 1/1959 | Goddard ....................... | 356/120 |
| 3,314,328 | 4/1967 | Boettcher..................... | 356/120 |
| 3,396,627 | 8/1968 | Rouy et al..................... | 356/120 X |
| 3,439,988 | 4/1969 | Breske.......................... | 356/120 X |

Primary Examiner—Ronald L. Wibert
Assistant Examiner—Warren A. Sklar
Attorneys—Walter O. Hodson and Paul R. Holmes ABSTRACT: An apparatus for inspecting a specular surface and a coating on said surface. A reference pattern is so positioned with respect to the surface that a reflection of the pattern appears on the surface. A diffusion plate is located between the reference pattern and the surface and is movable between a first position wherein the reflection of the pattern on the surface has a high contrast for inspecting the surface to a second position wherein the reflection of the pattern on the surface is diffused for inspecting the coating.

PATENTED SEP 28 1971 3,609,044

THOMAS J. MURPHY
INVENTOR.

BY
ATTORNEYS

APPARATUS FOR SELECTIVELY INSPECTING A WEB SURFACE AND A COATING ON THE SURFACE

BACKGROUND OF THE INVENTION

This invention relates to an apparatus for inspecting specular surfaces and in particular to an apparatus for inspecting a web having a specular surface and a coating on such surface. Although the present invention has many applications, it is particularly useful for inspecting for defects in a web and a coating thereon which will serve as a base for photosensitive materials.

The inspection for defects in webs has always been of critical importance especially where the web will be used in photographic applications. Small pits, pockets, scratches and areas of unevenness are difficult to detect on a specular surface and many complicated devices have been developed for their detection.

It is known that defects in a web are detectable by observing distortions in the image of a pattern of straight lines which is reflected off of a moving web surface. If there is a defect in the web, such as a pit or a pocket, each of the lines in the reflected image of the pattern intersected by the defect will appear distorted, thus indicating the presence of the defect.

The pattern that is used for such an inspection has a high contrast between the dark lines and the light background, whereby even the most minor distortions of a reflected dark line as caused by a small defect will be easily noted against the reflected light background. It is very difficult, however, for an inspector to view a high contrast image for a long period of time. It has been found that eye fatigue frequently occurs, and in certain cases inspectors have complained of the appearance of other visual phenomena such as swirly patterns. In either or both cases the result can be inferior inspection.

In addition to the above-indicated web defects, other defects may occur in extremely thin coatings placed on the web surface. Typical of such coatings are the subbing or adhesion layers which are placed on the web so that other coatings will better adhere to the web.

Of the defects that can occur in these coatings one that is more commonly inspected for is "coating unevenness." Areas of unevenness occur when too much or too little coating has been placed in a particular area on the web; and such unevenness will usually result from an improper adjustment in the coating apparatus. Because the coating layer is thin (usually in the range of a few microns) unevenness of the coating is difficult to detect. Usually the defects are local areas that are relatively thicker or thinner than the remainder of the coating; and under illumination such defects appear as iridescent stripes which extend longitudinally along the web. The iridescence is similar to the iridescence which is noted when a thin oil film exists on a still pool of water.

A common practice for inspecting for unevenness in the coating is to cut a strip of the web and hold the strip in a plane in line with a light source so that the light source is reflected off the web surface. The plane of the strip is then changed to vary the angle of the light source with respect to the web. The inspector observes the web surface as the plane of the web is changed to detect any areas of iridescence. This practice is time consuming and does not lend itself to continuous inspection procedures.

Accordingly, there has been a need for a means which can be used to inspect for defects in webs, which reduces inspector eye fatigue and other visual effects, and which can be used to inspect for unevenness in the coating layer.

SUMMARY OF THE INVENTION

The present invention is embodied in an apparatus for inspecting for defects in a web and for unevenness in a coating placed on the web.

With an apparatus in which the principle of the present invention is embodied, an inspector views a reference pattern image reflected from a specular surface. The image can be varied from a high-contrast reference pattern for inspecting for defects in the web, to an image that is diffused and which can be utilized to inspect for unevenness (iridescence) in a web coating.

The contrast of the image on a web surface by the apparatus is variable so that the inspector can establish a degree of contrast for the pattern image at which the effects of eye fatigue and adverse visual phenomena are reduced. Furthermore, an apparatus utilizing the principle of the present invention can produce a reflected image having a degree of contrast which enables the apparatus to be used for inspecting for both web and coating defects simultaneously.

In one preferred embodiment of an apparatus for inspecting a specular surface there is a light source and means for defining an opaque reference pattern on a high transmissive sheet preferably disposed oblique to the surface and positioned between the light source and the surface so that the reference pattern appears as a reflected image on the surface. A diffusion means is positioned between the reference pattern and the surface and is adapted for movement between a first position wherein the diffusion means is so positioned with respect to the pattern that the reflected image of said pattern is of relatively high contrast, to a second position wherein the diffusion means is so positioned with respect to the pattern that the reflected image is obliterated and diffused.

More specifically the apparatus comprises a light source and a planar pattern sheet transmissive to light having a reference pattern thereon. The pattern sheet is preferably disposed obliquely to the surface and positioned between the light source and the surface so that the pattern appears as a reflected image in the web surface. In one embodiment the reference pattern comprises a plurality of parallel stripes oriented bias the web. A translucent plate is pivotally mounted from an edge of the pattern sheet between the pattern sheet and the web. The diffusion plate is movable between a first position wherein said plate is so positioned with respect to the pattern that the reflected image of said pattern on the web surface is a high contrast image, to a second position wherein the image reflected on the web surface is a diffused obliterated image.

The various features of novelty which characterize the invention are pointed out with particularity in the claims annexed to and forming a part of the specification. For a better understanding of the invention, the operating advantages and the objectives obtained by its use, reference should be had to the accompanying drawings and descriptive matter in which a preferred embodiment of the invention has been illustrated.

DESCRIPTION OF THE PREFERRED EMBODIMENT

Figure 1:
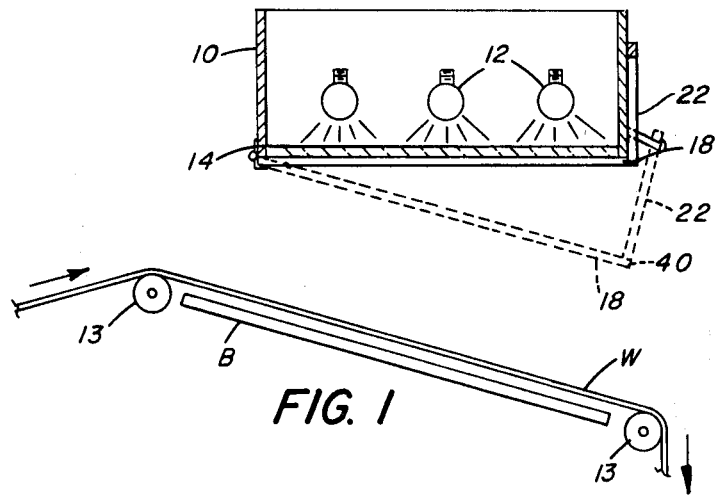
FIG. 1 is a side view partially sectioned of the preferred embodiment of the present invention.

The basic elements of an inspection apparatus in which the present invention is embodied are shown in FIG. 1 wherein a box 10 contains a light source 12. One side of the box is a sheet, hereinafter referred to as a pattern sheet 14. A reference pattern 16 (e.g., a striped pattern or series of lines) is provided on the surface of the pattern sheet 14. A diffusion plate 18 formed of translucent material is pivotally mounted by means of a hinge at one end from the box 10. In the preferred embodiment the diffusion plate is a glass plate having a frosted surface on the side nearest the pattern. The diffusion plate is movably attached at its other end to the box 10 by means of a bracket 22. The entire apparatus is preferably positioned over the web W at an oblique angle relative to the plane of the web. The apparatus is adapted to be mounted in a web transporting machine (not shown) wherein the web can be moved through a predetermined path. FIG. 1 shows transport rollers 13 of standard design for conveying the web beneath the apparatus.

When the light source 12 is energized and the diffusion plate 18 is in a position adjacent the reference pattern 16, the image of the reference pattern 16 is reflected on the web W surface. In this position diffusion of the image by the plate 18 is minimized. The light source can be a commercially available incandescent lamp or other suitable lamp that radiates visible light.

Figure 2:
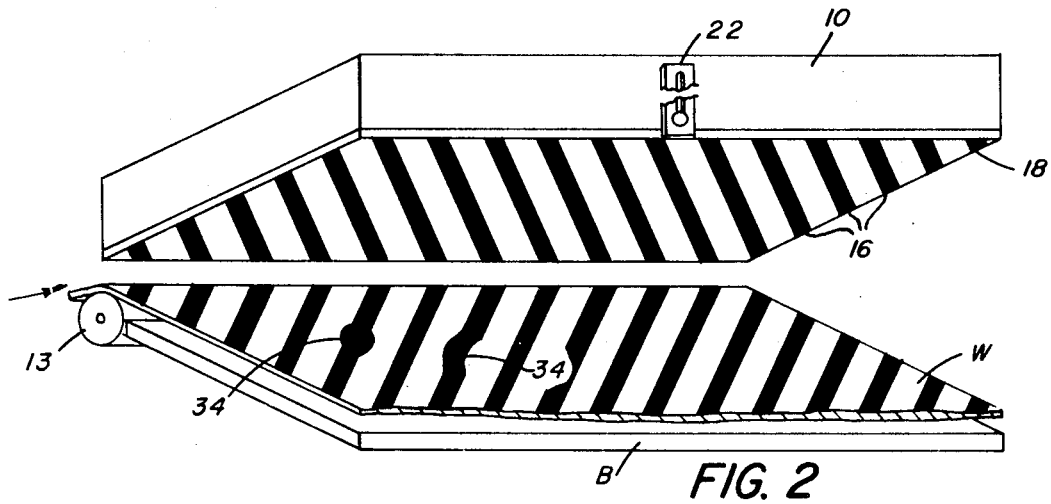
FIG. 2 is a perspective view of the preferred embodiment of the present invention showing the diffusion plate positioned adjacent the pattern sheet.

Referring to FIGS. 1 and 2, when the light source 12 is energized and the pattern sheet is in the position indicated with plate 18 contiguous to sheet 14 (also referred to as the first position) the reflected image of the reference pattern appears in the surface of the web. FIG. 2 shows the reflected image and also depicts two surface defects by showing the distorted portions of the reference pattern lines 34 in the reflected image. Pits, pockets, scratches and local areas of unevenness present an uneven surface upon which the image is reflected thereby causing the image of the reference pattern lines to bend in the area where the defects are located and making the presence of defects readily apparent. The defects are particularly detectable when the web is moving because a particular defect will intercept several lines in the diagonal pattern as the web moves.

In the preferred embodiment of the present invention the reference pattern is as shown in the figures a plurality of parallel stripes positioned bias the direction of web movement. We have found that when the stripes are positioned diagonally across the pattern sheet that the inspection apparatus can detect defects regardless of the orientation of the defects. For instance, if a scratch were positioned longitudinally in the direction of web travel, and the reference lines were also positioned in the direction of web travel, then a scratch that was positioned between the reflected images of two stripes could conceivably go undetected. However, with the lines positioned diagonally across the pattern sheet, the defect will move past the reflected image of a line and cause a deformation of the lines as the web is moved through the inspection station.

Of course, different reference patterns can be used with the present invention. Circular pattern, grids and the like can be used; however, for the inspection of defects in transparent webs, we have found, that diagonal parallel stripes give optimum results. It is also known that the width of a line and closeness of the lines to each other is determined by the size of the defect being detected.

The figures show a black panel B positioned below the web. We have found that when inspecting transparent products such as a web, that irregularities are best seen when the area behind the surface is uniform, non reflective and black.

Figure 3:
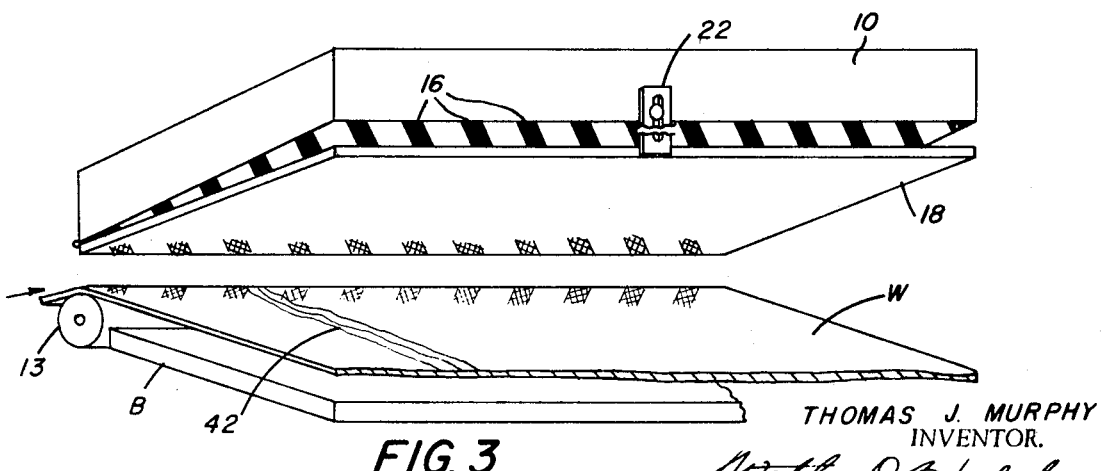
FIG. 3 is a perspective view of the preferred embodiment of the present invention showing the diffusion plate positioned in angularly spaced relation to the pattern sheet.

Referring now to FIGS. 1 and 3, the diffusion plate is shown in the position indicated by number 40 and hereinafter referred to as the second position. In the second position the image reflected in the surface of the web is obliterated because of diffusion by the plate and areas of iridescence on the web are easily discernible. The iridescent areas on the web appear as stripes 42 which are oriented longitudinally along the direction of web travel. These areas indicate that the coating on the web is not uniform.

We have found that the areas of iridescence are much easier detect when the image reflected from the web surface is diffused. The high contrast of the reference pattern reflected in the web surface makes it difficult for an inspector to detect the iridescent areas. When the contrast of the reflected image is lessened or relatively uniform—as is the case when the diffusion plate is the second position and the image is diffused and obliterated—the areas of iridescence are more apparent.

We have also found that an inspector can so position the diffusion plate that he can inspect for both web and coating defects at the same time. In such a position the contrast of the reference pattern is lessened so that the areas of iridescence are more easily detected. Of course, with a lower contrast reflected image, the smaller web defects may go undetected because minor distortions in the reflected block line will not be as readily noted against the background.

The reason the areas appear iridescent is due to the interference effect such as that which occurs when a light is reflected from a soap bubble or from a thin layer of oil floating on water.

The reason the image can be varied from a high contrast image to a diffused image is because the diffusion plate has translucent properties. When the diffusion plate is adjacent the reference pattern, the pattern shows through the translucent sheet in relatively high contrast just as any opaque object that is held against a translucent sheet will show as a shadow. However, as the diffusion sheet is moved away from the diffusion sheet, the shadows of the reference pattern become relatively lighter and the contrast of the dark to light areas of the reference pattern is lessened until the shadows of the reference pattern are no longer discernible and the image reflected in the web surface is a diffused light.

The invention has been described in detail with particular reference to preferred embodiments thereof, but it will be understood that variations and modifications can be effected within the spirit and scope of the invention.

I claim:

1. An apparatus for use with a light source for inspecting a specular surface and a coating on such surface, said apparatus comprising:
    pattern means including a light transmissive sheet supporting an opaque reference pattern to be positioned between the light source and said surface so that the reference pattern appears as a reflected image from said surface; and
    diffusion means mounted for movement relative to said pattern means between,
    a first position adjacent to said pattern means for transmitting said reference pattern so that the reflected image of said reference pattern from said surface is a perceptible high contrast image, and
    a second position remote from said pattern means for diffusing said reference patterns so that the reflected image from said surface is obliterated and diffused.

2. An apparatus for inspecting a web having a specular surface and a coating on such surface and movable through a predetermined path comprising:
    a source of visible light;
    a visible light transmissive sheet having a reference pattern thereon and positioned between said light source and said web in said path so that said reference pattern appears as a reflected image on said web surface; and
    diffusion means mounted between said sheet and said web for movement between a first position wherein said diffusion means is so positioned relative to said pattern that the reflected image of said reference pattern is a high contrast image to a second position wherein said diffusion means is so positioned relative to said pattern means that the reflected image of said reference pattern is diffused.

3. The invention according to claim 2 wherein said sheet and said diffusion means are planar.

4. The invention according to claim 3 wherein said reference pattern comprises a plurality of parallel stripes oriented bias the web.

5. The invention according to claim 4 further comprising:
    a black body having a uniform nonreflective surface positioned on the side of said web opposite said specular surface.

6. The invention according to claim 2 wherein said diffusion means is a translucent sheet.

7. The invention according to claim 1 wherein the apparatus further comprises:
    a housing for said light source and wherein said pattern means forms a wall of said housing and, said diffusion means is pivotally mounted from said housing adjacent an edge of said pattern means.

8. The invention according to claim 2 wherein the apparatus further comprises:
a housing for said source of visible light and wherein said sheet forms a wall of said housing and said diffusion means is a translucent sheet pivotally mounted from said housing adjacent an edge of said pattern means.

9. The invention according to claim 1 wherein said reference pattern is positioned oblique to the specular surface.

10. The invention according to claim 2 wherein said reference pattern is positioned oblique to the specular surface.